United States Patent [19]

Stratenus

[11] 3,755,198

[45] Aug. 28, 1973

[54] PROCESS FOR ADDING CADMIUM TO SUPPORTED NOBLE METAL DEHYDROGENATION CATALYST

[75] Inventor: Jan L. Stratenus, Amsterdam, Netherlands

[73] Assignee: Shell Oil Company, New York, N.Y.

[22] Filed: May 26, 1971

[21] Appl. No.: 147,183

[30] Foreign Application Priority Data
June 9, 1970 Netherlands....................... 7008386

[52] U.S. Cl............................ 252/466 PT, 252/473
[51] Int. Cl.............................................. B01j 11/12
[58] Field of Search...................... 252/466 PT, 473

[56] References Cited
UNITED STATES PATENTS

| 2,743,215 | 4/1956 | Riblett et al.................. 252/473 X |
| 2,384,501 | 9/1945 | Streicher...................... 252/466 PT |

Primary Examiner—Daniel E. Wyman
Assistant Examiner—W. J. Shine
Attorney—Howard H. Haworth and Martin S. Baer

[57] ABSTRACT

Cadmium or zinc is added to a supported noble metal dehydrogenation catalyst by contacting the catalyst with an inert gas containing metallic cadmium or zinc vapors.

3 Claims, No Drawings

PROCESS FOR ADDING CADMIUM TO SUPPORTED NOBLE METAL DEHYDROGENATION CATALYST

BACKGROUND OF THE INVENTION

1. Field of the Invention

The present invention relates to the preparation of dehydrogenation catalysts. More particularly it relates to improved cadmium or zinc containing noble metal catalysts, a process for their preparation, and their use in processes for dehydrogenation of paraffinic hydrocarbons to corresponding monoolefins.

2. The Prior Art

U.S. Pat. No. 3,662,019 is directed to the use of Group II $b$ or VI $b$ metal-containing supported noble metal catalysts to dehydrogenate paraffinic hydrocarbons to monoolefins. These catalysts are prepared conventionally by impregnating a suitable support with solutions of salts of the metals and then reducing at elevated temperatures. These catalysts, especially zinc or cadmium-containing noble metal catalysts, give excellent dehydrogenation results. However, at the reducing temperatures used in their preparation and at dehydrogenation operating temperatures, zinc or cadmium metal present in the catalysts tends to vaporize to some extent. Thus, during reduction, valuable cadmium or zinc metal is lost. Also, these catalysts become depleted in these metals with prolonged use. Conventionally, they must then be removed from service, reimpregnated with cadmium or zinc salt and re-reduced.

It is an object of this invention to provide a method for providing the cadmium or zinc content of these supported noble metal catalysts. It is a further object of this invention to provide a method for efficiently adding zinc or cadmium metal to supported noble metal catalysts in a form that is resistant to vaporization.

STATEMENT OF THE INVENTION

It has now been found that zinc or cadmium can be added to a supported noble metal catalyst by contacting the catalyst at elevated temperatures with an inert gas containing as vapor elemental zinc or cadmium. This method permits the addition of zinc or cadmium to a supported noble metal catalyst. With this method a depleted catalyst need not be removed from its reactor to add zinc or cadmium, but is suitably regenerated in situ. It has also been found that zinc or cadmium added to a noble metal catalyst by this method is more resistant to vaporization than when added by conventional methods.

DETAILED DESCRIPTION OF THE INVENTION

In accordance with this invention, zinc or cadmium is added to a noble metal catalyst in an especially advantageous form by contacting the noble metal catalyst with a stream consisting of a mixture of vapors of zinc or cadmium and an inert gas.

By the term "inert gas," as used herein, is meant a gas which is inert to elemental cadmium, zinc and noble metal at the conditions of the treatment. Examples of inert gases are hydrogen, nitrogen, and the noble gases such as argon and helium. Mixtures of these materials may, of course, by used. Hydrogen is a preferred inert gas.

The metal vapor is be added to the inert gas in a simple manner by passing the gas through a bath of molten zinc or cadmium or by other conventional mixing techniques.

The passage of gas through the molten metal bath generally produces a relatively saturated gas-phase solution of metal vapor in the inert gas. The amount of metal vapor mixed with the inert gas in part depends upon the vapor pressure of the metal, and thus on the temperatures employed in the preparation of the metal vapor solution and in the treatment of the noble metal catalyst. These temperatures generally range from about 325°C to about 600°C. At 325°C, a saturated mixture of zinc vapor contains about 0.05 percent zinc, of cadmium about 0.1 percent cadmium, at 600°C the vapor mixtures respectively contain 1.7 percent zinc and 13 percent cadmium. Preferred temperatures for catalyst treatment are from about 400° to 500°C. A preferred method of operation comprises cycling inert gas through a bath of molten zinc or cadmium, then over the catalyst. By repeating these cyclical steps, large quantities of inert gas need not be employed. The velocity of the inert gas/metal vapor is not critical.

The process is used to apply zinc or cadmium metal to a supported noble metal catalyst. Noble metals are metals of periods 5 and 6 of Group VIII of the Periodic System. They are ruthenium, palladium, rhodium, osmium, iridium and platinum. Particularly with platinum have excellent results been obtained. It is possible to start with a carrier on which the noble metal is already present in the metal form, or with a carrier on which the noble metal is formed in situ during the process. In the latter case a platinum compound can for instance be used as starting material. During the process this compound is converted into metallic platinum.

The catalysts treated by this invention generally contain from 0.05 to about 5 percent by weight of noble metal based on the weight of the total catalyst. This noble metal is dispersed on the surfaces of a suitably porous carrier.

Materials particularly suitable as carriers are high-melting oxides, mixed or otherwise, such as silica-alumina, alumina and magnesia. In general, porous carriers are suitable which have a surface area between 5 m²/g and 600 m²/g. Example of very suitable carriers are porous aluminas, since on these carriers the degree of dispersion of the alloy remains at a high level during application of the catalyst. Acid as well as non-acid carriers can be applied. In order to prevent undesirable side reactions, it is recommended that non-acidic carriers, in particular non-acidic aluminas, are used for catalysts to be applied in the dehydrogenation of hydrocarbons.

If desired, the catalysts can be made to include, besides cadmium or zinc, and the noble metal of Group VIII, one or more compounds of one or more other metals. For instance, catalysts to be used in dehydrogenation can advantageously be made to include a compound of an alkali metal or an alkaline earth metal. Preference is given to alkali metal compounds and in particular to sodium compounds. As alkali metal or alkaline earth metal compounds salts, oxides or hydroxides can very suitably be applied. Said compounds are usually applied in a quantity of 0.01–2%w and in particular of 0.1–0.5%w, calculated as alkali or alkaline earth metal on the carrier. A combination of alkali metal and alkaline earth metal compounds can be used. These metal compounds can be supported on the carrier before or after the elemental cadmium or zinc-containing gas has been passed over.

Not only is zinc or cadmium added to noble metal catalysts in a convenient fashion by the present invention, but also it is added in a form resistant to vaporization. A zinc or cadmium-containing noble metal catalyst prepared by this process is comparatively more resistant to zinc or cadmium loss by vaporization than similar catalysts prepared by conventional impregnation/reduction methods. The cause of this improvement is not known with certainty. It is believed, however, that zinc or cadmium, when added by the present process, forms a finely divided intermetallic compound with the noble metal present. This compound is of negligible volatility compared to zinc or cadmium alone. When platinum is the noble metal and cadmium or zinc are added by this process, an intermetallic compound forms having a 1:1 molar ratio. Cadmium or zinc can be added by the present invention up to the molar ratio of the compound. Other intermetallic compounds are formed with zinc or cadmium and with the other noble metals when treated in accord with this invention.

Materials Prepared

The catalysts prepared by this invention are useful in processes for the preparation of monoolefins by dehydrogenation of a saturated hydrocarbon chain. U.S. Pat. No. 3,662,019, while not dealing with catalysts prepared in this manner, does discuss fully this use of zinc or cadmium containing noble metal catalysts. In brief, a $C_6$–$C_{20}$ saturated hydrocarbon (paraffin) is passed over these catalysts at about 350°–525°C and 10 atm absolute or less pressure. This process yields a monoolefinically unsaturated hydrocarbon with high conversion and selectivity.

This invention will be further described by the following example. It is provided for illustration and is not intended to limit the invention.

EXAMPLE

Catalyst A was prepared as follows. A non-acidic alumina with a specific surface area of 76 m²/g and a sodium content of 0.5 percent by weight was impregnated with such an amount of an aqueous solution of tetrammineplatinum hydroxide that 0.5 percent by weight of platinum, calculated on basis of carrier, was present. The water was removed by drying at 120°C, and the platinum was reduced to the metal form by calcining at 500°C for 3 hours.

Part of the calcined material was impregnated with an aqueous solution of cadmium acetate containing 10 grams atoms of cadmium per gram atom of platinum present on the alumina. After drying at 120°C calcination was carried out for 4 hours at 500°C and after cooling the cadmium was converted to the metal form by reduction with hydrogen, the temperature being raised to 500°C and kept at this value for 1 hour. Catalyst A thus prepared had a platinum/cadmium atomic ratio of 1:2.9, so during the reduction with hydrogen 71 percent of the cadmium had been lost.

To prepare catalyst B, hydrogen was passed at atmospheric pressure through molten cadmium at a temperature of 450°C and subsequently through a bed of the remaining part of said calcined material. Catalyst B did not take up any more cadmium after the platinum/cadmium atomic ratio in the catalyst had become 1:1.

To test catalysts A and B separately, a mixture of n-dodecane and hydrogen was divided in two equal parts, the first of which was passed through a bed of catalyst A and the second through a bed of catalyst B. In both cases the space velocity was 6 kg of n-dodecane per kg of catalyst per hour, the temperature 450°C, the pressure atmospheric and the n-dodecane/hydrogen molar ratio in the starting mixture 1:3.

The results have been listed in the table.

TABLE

| | Catalyst A (not prepared according to the invention) | | Catalyst B (prepared according to the invention) | |
|---|---|---|---|---|
| run hours | 2 | 24 | 2 | 24 |
| conversion, % | 28.5 | 24.3 | 27.5 | 23.7 |
| selectivity to n-dodecene,% | 75.4 | 79.0 | 74.5 | 84.0 |
| Pt/Cd atomic ratio | 1:2.7 | 1:1.9 | 1.0:1.0 | 1.0:1.0 |

These results indicate that (a) the two catalysts are almost equally active, (b) catalyst A loses cadmium during use and (c) catalyst B does not lose cadmium during use.

An X-ray examination and a chemical analysis showed that after 24 run hours catalyst A contained 53%at. of its cadmium atoms in an intermetallic compound with platinum and 47 percent of its cadmium atoms as elemental cadmium. In catalyst B all the platinum and cadmium were present as an intermetallic compound.

We claim as our invention:

1. The process for adding cadmium metal to a noble metal catalyst on a non-acidic alumina support which comprises contacting said supported noble metal catalyst at a temperature in the range of from 325°C to about 600°C with a gaseous mixture consisting essentially of inert gas and vapors of cadmium metal.

2. The process in accordance with claim 1 wherein the inert gas is hydrogen and the temperature is in the range of from 400° to 500° C.

3. The process in accordance with claim 2 wherein the noble metal is platinum.

* * * * *